United States Patent
Bazaz

(10) Patent No.: US 9,938,963 B2
(45) Date of Patent: Apr. 10, 2018

(54) POWER GENERATION FROM ATMOSPHERIC AIR PRESSURE

(71) Applicant: Spar Energy LLC, Edgewater, NJ (US)

(72) Inventor: Gaurav Bazaz, Edgewater, NJ (US)

(73) Assignee: Spar Energy LLC, Edgewater, NJ (US)

( * ) Notice: Subject to any disclaimer, the term of this patent is extended or adjusted under 35 U.S.C. 154(b) by 86 days.

(21) Appl. No.: 14/142,856

(22) Filed: Dec. 29, 2013

(65) Prior Publication Data

US 2014/0182278 A1  Jul. 3, 2014

Related U.S. Application Data

(60) Provisional application No. 61/747,240, filed on Dec. 29, 2012.

(51) Int. Cl.
| | | |
|---|---|---|
| *F03D 7/02* | (2006.01) | |
| *F03D 9/00* | (2016.01) | |
| *F03D 1/04* | (2006.01) | |
| *F03D 9/25* | (2016.01) | |

(52) U.S. Cl.
CPC ............... *F03D 9/002* (2013.01); *F03D 1/04* (2013.01); *F03D 9/25* (2016.05); *Y02E 10/725* (2013.01)

(58) Field of Classification Search
CPC ... F03D 9/002; F03D 9/25; F03D 1/04; F03D 9/30; F03D 9/034; F03D 9/41; F03D 1/00; Y02E 10/725; Y02E 10/72; F03F 9/002; H02D 10/12; Y10S 415/908

USPC ....... 415/218.1, 219.1, 1, 4.3, 4.5, 144, 185, 415/220, 905, 908; 290/44, 55
See application file for complete search history.

(56) References Cited

U.S. PATENT DOCUMENTS

| | | | | |
|---|---|---|---|---|
| 1,045,865 | A | * | 12/1912 | Magni ........................ 73/861.33 |
| 1,578,923 | A | * | 3/1926 | Schlotter ....................... 415/148 |
| 3,750,397 | A | * | 8/1973 | Cohen et al. ................... 60/804 |
| 4,066,552 | A | * | 1/1978 | Caine ............................ 210/304 |
| 4,132,499 | A | * | 1/1979 | Igra .......................... F03D 1/04 |
| | | | | 290/55 |
| 4,149,374 | A | * | 4/1979 | Barchenko ...................... 60/225 |
| 6,382,904 | B1 | * | 5/2002 | Orlov ........................ F03D 1/04 |
| | | | | 415/1 |
| 8,814,493 | B1 | * | 8/2014 | Komp ............................... 415/1 |
| 2008/0232957 | A1 | * | 9/2008 | Presz ........................ F03D 1/04 |
| | | | | 415/191 |

(Continued)

*Primary Examiner* — William V Gilbert
(74) *Attorney, Agent, or Firm* — Hard IP LLC

(57) ABSTRACT

An apparatus and method is provided for generating net energy by converting the natural pressure of atmospheric air into kinetic energy, which is then converted to mechanical energy by a turbine, which can then be converted to electric energy through a generator. The method relies on natural physical phenomena such as Entrainment, Inducement and the Venturi Effect to increase the mass and velocity of air flowing through an enclosed chamber without increasing the amount of energy consumed to increase the air flow mass and velocity. A turbine-generator apparatus connected to the chamber is driven by the air flow to generate electric power which is greater than the power consumed to generate the initial air flow. Power is generated through extraction of kinetic energy from natural atmospheric air pressure energy.

4 Claims, 6 Drawing Sheets

(56) References Cited

U.S. PATENT DOCUMENTS

2011/0135443 A1* 6/2011 Cucci ..................... F03D 3/02
                                                         415/1
2011/0198855 A1* 8/2011 White ........................ 290/55

* cited by examiner

POWER GENERATION FROM ATMOSPHERIC AIR PRESSURE

RELATED APPLICATION

This application claims the benefit of priority to U.S. Provisional Application 61/747,240 filed 29 Dec. 2012, the entire disclosure of which is incorporated by reference.

FIELD OF INVENTION

The present invention relates to generation of electric power from clean energy sources.

BACKGROUND

Various methods are used to generate power using natural resources such as fossil fuels. Energy is also generated using environmentally friendly methods that do not generate pollutants. These methods include solar energy and wind energy. Most existing methods for producing renewable energy suffer from various problems such as low efficiency, inconsistent output, high cost or geographic limitations.

SUMMARY OF INVENTION

A method and apparatus is proposed for generating net energy through multiplication of fluid flow and increasing the velocity of flow through an enclosed chamber. Known physical phenomena such as Inducement and Entrainment can be used to substantially increase the amount of fluid in motion through the body of the fluid and the Venturi effect can be used to convert pressure energy into kinetic energy. These phenomena are largely driven by the natural fluid pressure within the interior of a volume of the fluid. In case of air, atmospheric pressure, the random motion of air particles, provides the pressure within a volume of air to drive these phenomena.

Inducement is a phenomena wherein the directional flow of a substantial amount of fluid within a volume of the fluid, causes more fluid behind the moving fluid to enter into motion and join the mass of flowing fluid within the larger volume.

Entrainment is a phenomena wherein, the directional flow of a mass of fluid within a larger volume of the fluid causes the fluid around the moving mass to also enter into motion and join the mass of moving fluid in directional flow.

When a mass of fluid is pushed through a narrowing channel, the reduction in flow cross-sectional area causes an increase in velocity of flow, in accordance with the Venturi Effect, which in turn causes an increase in the kinetic energy of the flow, while reducing the pressure energy of the flow. When a mass of fluid is put into motion by an external force, within a body of the fluid, phenomena such as Inducement and Entrainment can help to dramatically increase the amount of fluid in motion, multiplying the actual fluid in motion compared to the amount originally placed in motion by the external force. Therefore, a limited amount of external force, generating a reasonable flow of fluid, can produce a much larger flow of fluid without application of additional force, therefore without expenditure of additional energy.

Some apparatus and methods are proposed that leverage such phenomena to generate net energy. An apparatus is proposed wherein, fluid such as air is pushed in at one end of a chamber using a device such as an impeller or fan, which then exits through the other end of the chamber. A turbine within the chamber is turned through the force of the movement of the fluid, which turbine is connected to a generator which produces electric energy. The design of the chamber is such that, natural phenomena such as Inducement and Entrainment are leveraged to increase the total fluid flowing per unit time per unit cross-sectional area along the path of flow, as additional fluid is pulled in from outside the chamber through inlet slits by the natural flow of the fluid within the chamber. Therefore, the total fluid mass per unit time driving the energy producing turbine is considerably greater than the fluid injected into the chamber by the impeller at the inlet. Therefore, the power generated by the turbine is greater than the power consumed by the impeller and other device components resulting in generation of net positive power. This additional energy is extracted from atmospheric pressure, and is a direct conversion of the pressure energy of the atmosphere into kinetic energy, which in turn is converted into electric energy by the turbines and generators.

In one embodiment of the device, the chamber is a funnel like tube with a narrow end and a broad end. The tube has openings on both ends and is immersed within a fluid such as air. For simplicity, we shall describe the operation of the device with air as the operating fluid hereon. However, the device can work with other fluids such as water as well. The narrow end of the tube has a small opening and the broad end has a larger opening.

An impeller or fan pulls air from the surrounding body of air and forces it into the tube through a ring like toroidal opening at the narrow end inlet of the tube. The ring shaped inlet at the tube opening would generally be the same radius as the tube inlet. The air is injected into the tube towards the broad end through the ring shaped opening. As the air enters the tube through the ring shaped inlet, at high speed, inducement is created at the narrow end inlet of the tube behind the ring shaped inlet which causes additional air for outside the tube to be sucked into the tube through the narrow end opening.

As the air flows through the tube, towards the broad end, it flows along the internal surface of the tube. The tube has small inlet slits built in its surface. In addition, two sets of airfoils are also placed along the channel. One set, called the Pressure Airfoils, are placed right next to inlet slits, just before the slits, along the path of the flow. A second set of airfoils, called the Velocity Airfoils, is placed along the inner side of the flow channel, opposite the Pressure Airfoils, and just before the Pressure Airfoils. As the air flows across the surface, entrainment occurs and air near the inlet slits is pulled into the flow as well. As a result, a low pressure region is created near the slits. Additionally, as a result of the Pressure Airfoils, a region of strong low pressure is created near the inlet slits. Due to the low pressure region created by the Pressure Airfoils near the inlet slits, on the inside of the flow channel, air from outside the device, is pulled into the flow channel through the inlet slits. As a result, the amount of air in motion per unit time per unit cross-sectional air increases through the flow channel, along the flow of the fluid, and at the broad end it is much greater than the amount of air put into motion at the narrow end originally by the impeller. The Velocity Airfoils help increase the flow velocity by creating a region of constricted flow in the channel, which results in the Venturi Effect. This increased velocity helps increase the magnitude of low pressure at the inlet slits. Additionally, a region of low pressure results right behind the Velocity Airfoils, which low pressure region is diametrically opposite the inlet slit. This causes the direction of flow of fluid in the body of the flowing fluid, to be inwards into the flow channel, which prevents the internal flow from crashing against the pulled in flow from the inlet slits. The increase in volume of air can be very large, for instance, as much as 5-25 times greater mass of air at the broad end compared to the narrow end.

A turbine is placed at the broad end, connected to a generator. As the mass of air within the tube move across the turbine, it turns the turbine which in turn generates power through the generator. The amount of power generated by the generator is proportional to the mass of air flow across the turbine per unit time. Similarly, the power consumed by the impeller at the narrow end, is proportional to the mass of air moved by it per unit time. Since the mass of air per unit time, per unit cross-sectional area flowing across the turbine is much greater than the mass originally injected into the tube by the impeller, the power generated by the turbine-generator at the broad end is greater than the power consumed by the impeller at the narrow end. There are also few other active energy consuming components, so there is very little power consumption by the apparatus. If the multiplication in fluid flow is large enough, then after adjusting for loss of energy from efficiency losses at the injection and efficiency losses at the reconversion by turbine-generator, the device should be able to produce positive net energy.

The device generates net power primarily by extracting energy from the natural pressure of a fluid mass in a gravitational field. For instance, the air in earth's atmosphere is held close to the surface by the gravitational field of the earth. The pressure within this mass of air is the energy stored in the air by heating from solar power. As the sun's light rays hit air molecules, they transfer some energy to the air and heat it up. This heat is the pressure energy of the atmosphere. Additionally, the air also gathers lot of heat energy from the land, as a result of heating up on contact with land. This solar energy, indirectly acquired from the land, is also stored as pressure energy by the air. The device proposed here, extracts this energy by leveraging phenomena such as entrainment, inducement and the Venturi effect to convert this pressure energy to kinetic energy, which can be used to drive a turbine and generate power from a generator.

Advantages of proposed device:
a. Clean, renewable energy production
b. Very highly scalable from kilowatts to megawatts
c. Can be placed and built anywhere, no geographic limitations
d. Consistent power supply, no dependence on weather or sun or other climactic factors
e. No pollution, no fuel required
f. Low Cost

DETAILED DESCRIPTION OF DRAWINGS

Figure 1:
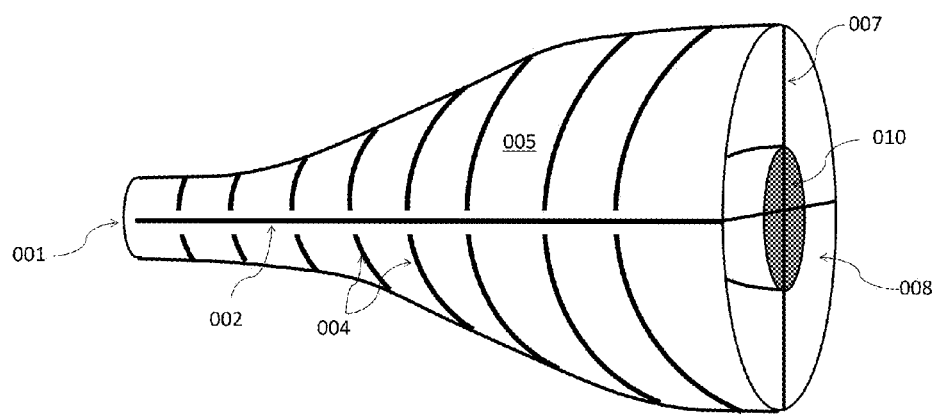
FIG. 1 provides a high level simple external view of the Wing Multiplier Generator ('WMG') apparatus.

FIG. 1 provides a high level external view of the Wind Multiplier Generator ('WMG') apparatus. The apparatus consists of an inlet 001 from where fluid in injected, an outlet 008 from where the injected fluid exits the apparatus, an external cone 005, an internal cone 010, cross-ribs structures 002 and 007 which hold the internal cone 010 and external cone 005 together. The external cone 005 also has inlet slits 004 all along its surface. The space between the internal cone 010 and external cone 005 forms the Flow Channel ('FC') through which the fluid injected at inlet 001 flows. The inlet slits 004 provide an entry passageway from which any fluid outside the WMG apparatus can enter into the apparatus and join the fluid flowing in the Flow Channel.

Figure 2:
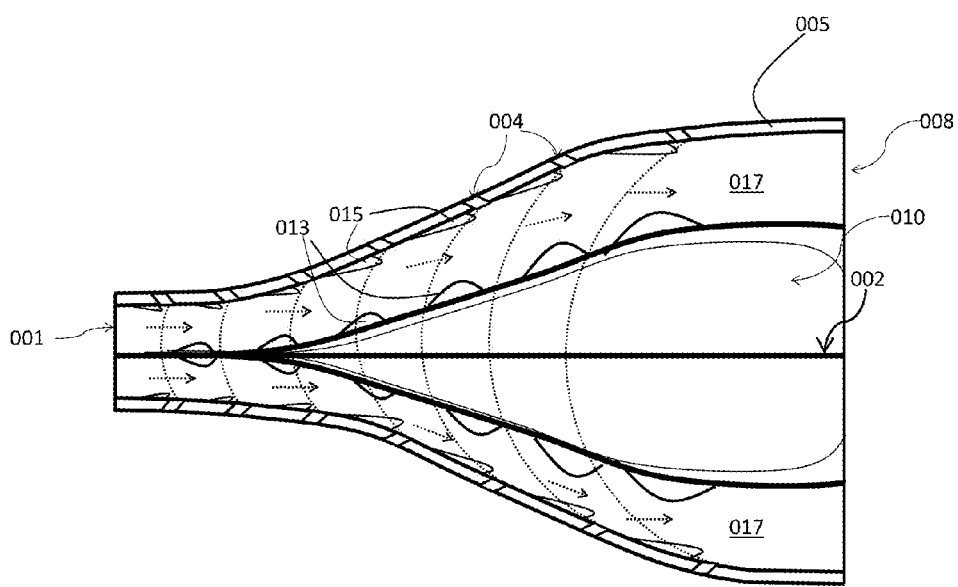
FIG. 2 provides detailed view of the inside of the WMG apparatus, in a simple cross-section view. This figure also explains the mode of operation of the apparatus.

FIG. 2 provides a detailed cross-sectional internal view of the WMG apparatus. The view provided here is what one would see if the apparatus was cut in half across its center line. We again see the inlet 001, the outlet 008, the inner cone 010, the outer cone 005, the cross-rib 002 and the side slit inlets 004. We now also see the Pressure Airfoils 015 and Velocity Airfoils 013. All airfoils on the outer cone 005 are Pressure Airfoils, while all airfoils on the inner cone 010 are Velocity Airfoils. The fluid is injected into the WMG apparatus at the inlet 001, at a high speed, at least above 50 meters per second and below 350 meters per second. For sake of simplicity, rest of the explanation will assume the fluid injected is Air, though in practice it may be any fluid including water or a mixture of fluids. As the injected air travels through the Flow Channel 017, as shown by the dotted arrows, it slips past the walls of the inner and outer cones, and also along the surface of the Pressure and Velocity airfoils. As the injected air flows past the inlet slits 004, due to entrainment, it pulls the stationary air near the slits along into the flow. Additionally, as the injected air flows past the Velocity Airfoils 013, it picks up speed due to the constriction of the Flow Channel caused by these airfoils, resulting in the Venturi Effect. As the injected air flows past the Pressure Airfoils 015, it creates a region of low pressure near the slits 004, which are adjacent to the Pressure Airfoils. This is normal fluid dynamics behavior where low pressure regions are created behind a solid body in the flow. This low pressure is low relative to the pressure of the stationary atmospheric air outside the apparatus, on the other side of the slits. Due to this pressure difference, between the flowing air in the Flow Channel 017, and the atmospheric air outside, the air outside rushes into the Flow Channel 017 and joins the existing flow. At each slit 004, the same phenomena is repeated and more air is pulled from outside into the Flow Channel 017 and joins the flow of air inside the WMG apparatus. As a result, the mass of air exiting the apparatus at outlet 008 is much greater than the mass of air injected into the apparatus at inlet 001. Since the total mass of air exiting the apparatus is much greater, than the mass injected, if the drop in velocity of flow at the outlet is relatively small enough, then the apparatus allows for a net gain in Kinetic Energy. The exiting flow is used to power a turbine which works with an electric generator to produce electrical power. The turbine and generator apparatus are not shown here as they are freely available apparatus.

Figure 3:
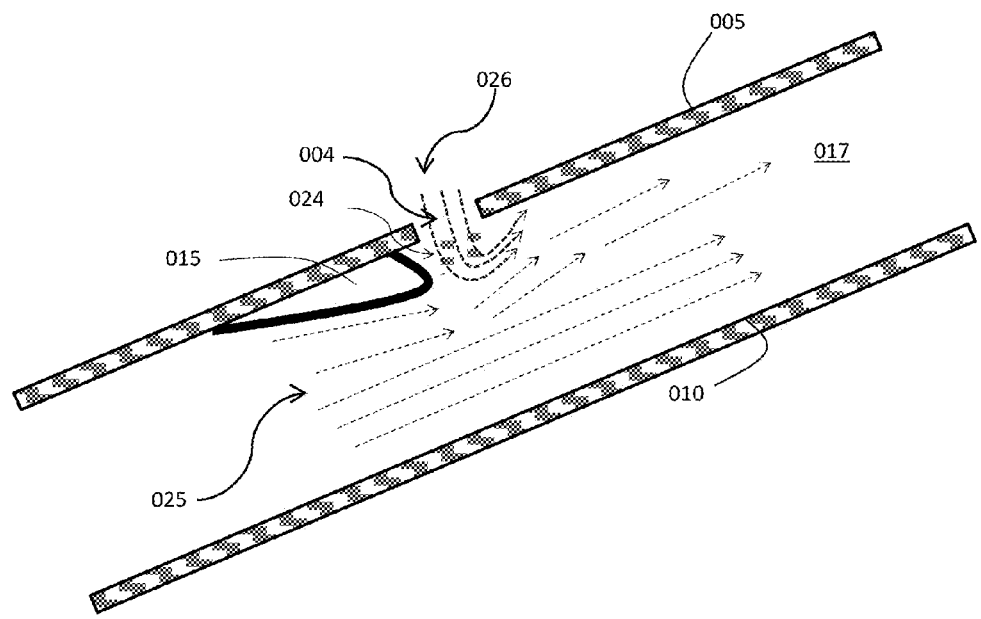
FIG. 3 provides an explanation of the workings of the Permanent Low Pressure system.

FIG. 3 provides a more detailed view of the inlet slits 004 and how the Permanent Low Pressure System ('PLPS'), one of the major innovations presented here, works. Note, the words 'fluid' and 'air' are used here interchangeably, and the PLPS systems works with any fluid, air being just one of the possible fluids. We see a close-up view of one section of the WMG apparatus, where we have the external cone 005, the internal cone 010, the Pressure Airfoil 015 and the inlet slit 004. The Velocity Airfoil has not been shown for simplicity, and also because it is not required for the PLPS. As the injected fluid 025 flows in the Flow Channel 017, it goes past the Pressure Airfoil 015. As it goes past, a region of low pressure 024 is created behind the Pressure Airfoil 015, near the inlet slit 004. Due to the pressure difference phenomena explained in FIG. 2, atmospheric ambient air 026 outside the apparatus rushes into the Flow Channel 017 through the slit 004. However, since the low pressure region is not enclosed, and the injected air 025 is still flowing in the Flow Channel, this external air 026 joins the injected air 025 and continues to flow in the Flow Channel, away from the low pressure region 024. As a result, the low pressure region 024 is never equalized with the ambient pressure, and continues to hold its lower pressure state, in spite of air flowing through it constantly, and having higher pressure regions surrounding it. This PLPS acts as a permanent mechanism to draw in air from outside the apparatus, while requiring no additional energy to be expended to maintain it. Energy is only expended when the low pressure region is first created, and not after that. This is a unique innovation which allows fluid flow to be caused, utilizing the inherent atmospheric pressure of the ambient fluid, and requiring no additional expense of energy. Note, the WMG apparatus shows only one implementation of this model, and the same PLPS model can be implemented in other systems as well, apart from the WMG apparatus, or its variations.

Figure 4:
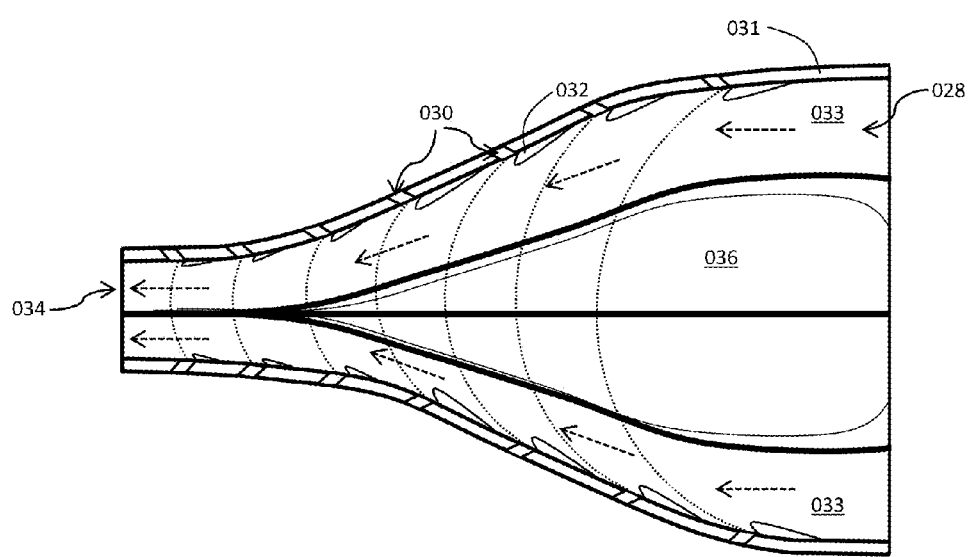
FIG. 4 provides a detailed view of the inside of the Venturi Pressure Converter Generator ('VPCG') apparatus, which is a variation of the WMG apparatus, including its mode of operation.

FIG. 4 provides a detailed internal cross-section view of the Venturi Pressure Converter Generator ('VPCG') model. The view provided here is what would be visible if the apparatus was cut in half across its center line. Note, the words 'fluid' and 'air' are used here interchangeably, and the PLPS systems works with any fluid, air being just one of the possible fluids. The apparatus is very similar to the WMG apparatus, except the direction of fluid flow is reversed. Also, the direction of the Pressure Airfoils is reversed in accordance with the direction of fluid flow. The apparatus consists of the inner cone 036, the outer cone 031, the Flow Channel 033, side slit inlets 030, Velocity Airfoils 032, inlet 028 and outlet 034. The fluid is injected from the inlet 028, and exits the apparatus from the outlet 034. As the fluid flows through the apparatus in the Flow Channel 033, it uses the same phenomena as the WMG apparatus to increase the mass of fluid in flow in the Flow Channel, so that the mass of air flowing out at outlet 034 is greater than the mass of fluid injected at inlet 028. However, in addition, the Flow Channel becomes narrower along the direction of flow, so that the outlet cross-section area is much smaller than the inlet cross-section area. This results in a considerable increase in the velocity of fluid flow in the Flow Channel 033, due to the Venturi Effect. Therefore, the fluid flows out from the outlet 034 at a higher velocity than the velocity at which it was injected at the inlet 028. The increase in velocity represents an increase in kinetic energy, so that the device increases the kinetic energy of the flow both from increase in mass of flowing fluid as well as through increase in velocity of the flowing fluid. Therefore, the kinetic energy of the fluid when flowing out from the outlet 034 is much higher than the energy expended to inject the fluid at inlet 028. This increase in energy can be utilized to drive a turbine which paired with a generator can generate electric energy. We can achieve a gain in net energy as the energy extracted from the fluid at the outlet, can be much higher than the energy expended to inject the fluid at the inlet.

Figure 5:
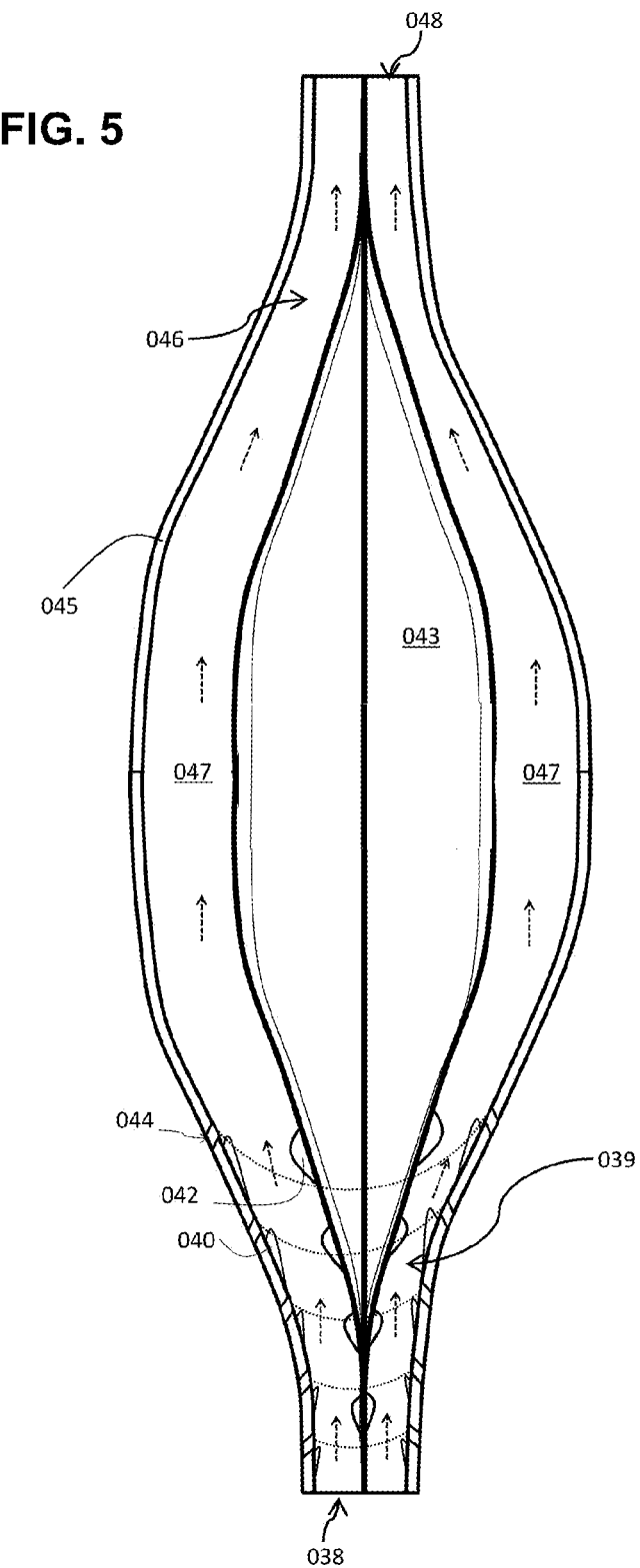
FIG. 5 provides a detailed view of the inside of the Hybrid Venturi Multiplier Generator ('HVMG') apparatus, which is another variation of the WMG apparatus, including its mode of operation.

FIG. 5 is a detailed view of the inside of the Hybrid Venturi Multiplier Generator ('HVMG') apparatus. The view visible is what one would see if the apparatus was cut in half along its center line. The apparatus consists of the inner cone 043, the outer cone 045, the inlet 038, the outlet 048, the Flow Channel 047, the Pressure Airfoils 040, the Velocity Airfoils 042 and the inlet slits 044. The apparatus consists of two regions, the Mass Multiplication Region 039 and the Venturi Compression Region 046. Fluid is injected from the inlet 038, and flows across the Flow Channel 047. As it runs past the inlet slits 044, the Velocity Airfoils 042 and the Pressure Airfoils 040, the same mode of operation as explained for the WMG apparatus, in FIG. 2, is seen. Ambient fluid from outside the apparatus is pulled in through the inlet slits 044, into the Flow Channel 047. This results in an increase in the mass of fluid flowing through the apparatus in the Flow Channel, in the Mass Multiplication Region 039. As the fluid moves through the Flow Channel 047, and through the Venturi Compression Region 046, it experiences the Venturi Effect due to narrowing Flow Channel, as a result of which the fluid velocity increases. Therefore, we get an increase in mass of flowing fluid as well as increase in velocity, but in different regions. As a result, the total mass of fluid exiting the apparatus at outlet 048 is more than the mass injected at inlet 038. Additionally, the velocity of fluid at outlet may be almost same or higher than the velocity at which it was injected.

Figure 6:
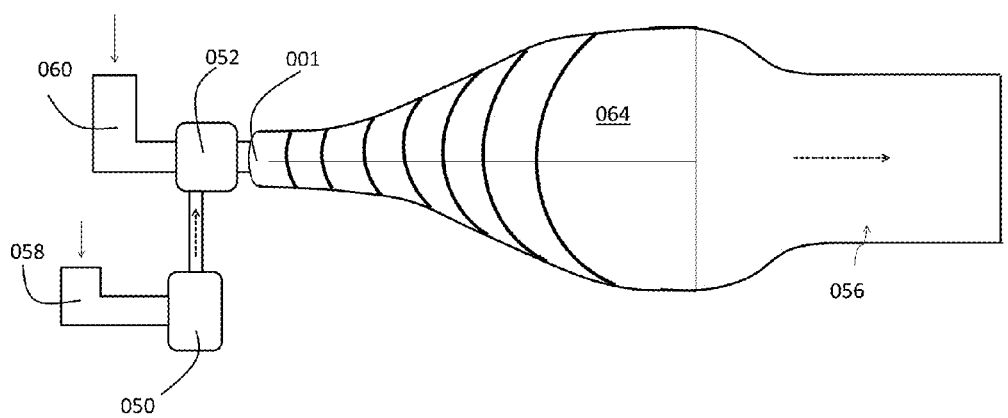
FIG. 6 provides a high level simplified schematic explaining the overall setup within which the WMG apparatus may be placed for production operation. The same setup, with minor modifications, may be used for the VPCG and HVMG apparatus as well.

FIG. 6 provides a high level simplified schematic explaining the overall setup within which the WMG apparatus may be placed for production operation. The same setup, with minor modifications, may be used for the VPCG and HVMG apparatus as well. A turbofan 050 is run at high speeds to draw in ambient air from an inlet duct 058. The turbofan injects the air into an Injection Ring 052. The Injection Ring 052 redirects the flow of the air into the inlet 001 of the WMG apparatus. Also the Injection Ring 052, uses the phenomena of Inducement to pull in additional ambient air through the Inducement Duct 060. The injected fluid passes through the WMG apparatus 064, and then exits through the reconversion channel 056, where a turbine is placed to convert the kinetic energy of the flowing fluid into mechanical energy, which is then converted to electrical energy by the generator.

The invention claimed is:

1. An apparatus comprising:
   a chamber including an inlet that receives injected air and an outlet through which a mixture of the injected air and drawn-in ambient air exits, and the chamber being defined by an enclosure having an exterior surface and an interior surface defining a substantially constant thickness;
   an internal cone within the chamber between the inlet and the outlet, wherein the internal cone gradually increases in size from the inlet to the outlet, wherein a first end of the internal cone proximate to the inlet is narrower in size than a second end of the internal cone proximate to the outlet, wherein a space between the interior surface of the chamber and the internal cone forms at least one flow channel; and
   the at least one flow channel within the chamber being located between the inlet and the outlet, the at least one flow channel comprising:

a first aperture, created by a first slit extending through the thickness, through which a first portion of ambient air external to the chamber is drawn into the at least one flow channel, due to a first low pressure in the at least one flow channel, to become a first portion of the drawn-in ambient air; and a first pressure airfoil at a first position on the interior surface of the chamber and a second pressure airfoil at a second position spaced along a longitudinal length of the chamber on the interior surface of the chamber, wherein the first slit is situated between the first and the second positions to create the first low pressure.

2. The apparatus of claim 1, further comprising:
a fan situated proximate to the inlet to provide the injected air to the at least one flow channel at a velocity within 50 meters per second and 350 meters per second.

3. The apparatus of claim 1, further comprising:
a turbine proximate to the outlet and driven by a flow of the injected air and the drawn-in ambient air exiting from the at least one flow channel; and
a generator, connected to the turbine, that converts mechanical energy from a rotation of the turbine into electrical energy.

4. The apparatus of claim 1, further comprising:
a first velocity airfoil at a position, on a second interior surface of the at least one flow channel, situated substantially across from the first pressure airfoil to provide a constriction within the at least one flow channel.

\* \* \* \* \*